United States Patent [19]

Benes et al.

[11] Patent Number: 4,817,430

[45] Date of Patent: Apr. 4, 1989

[54] SYSTEM FOR DETERMINING THE THICKNESS OF VARYING MATERIAL COATINGS

[75] Inventors: Ewald Benes, Biedermannsdorf; Paul Berlinger, Vienna, both of Austria; Gernot Thorn, Hanau, Fed. Rep. of Germany

[73] Assignee: Leybold Aktiengesellschaft, Hanau, Fed. Rep. of Germany

[21] Appl. No.: 130,083

[22] Filed: Dec. 8, 1987

[30] Foreign Application Priority Data

Jan. 8, 1987 [DE] Fed. Rep. of Germany ....... 3700366

[51] Int. Cl.$^4$ .............................................. G01B 17/02
[52] U.S. Cl. ......................................... 73/579; 324/71.5
[58] Field of Search ..................... 73/579, 602, 150 R, 73/574; 324/71.5, 80

[56] References Cited

U.S. PATENT DOCUMENTS

| 3,723,778 | 3/1973 | Lu ..................................... 73/150 R |
| 4,588,942 | 5/1986 | Kitehara .............................. 324/71.5 |

FOREIGN PATENT DOCUMENTS

| 3412724 | 10/1985 | Fed. Rep. of Germany .... 73/150 R |
| 1199051 | 12/1959 | France ................................... 73/579 |
| 7134603 | 12/1967 | Japan ..................................... 73/579 |
| 7134604 | 12/1967 | Japan ..................................... 73/579 |

Primary Examiner—Tom Noland
Assistant Examiner—Lawrence G. Fess
Attorney, Agent, or Firm—Felfe & Lynch

[57] ABSTRACT

Figure 2:
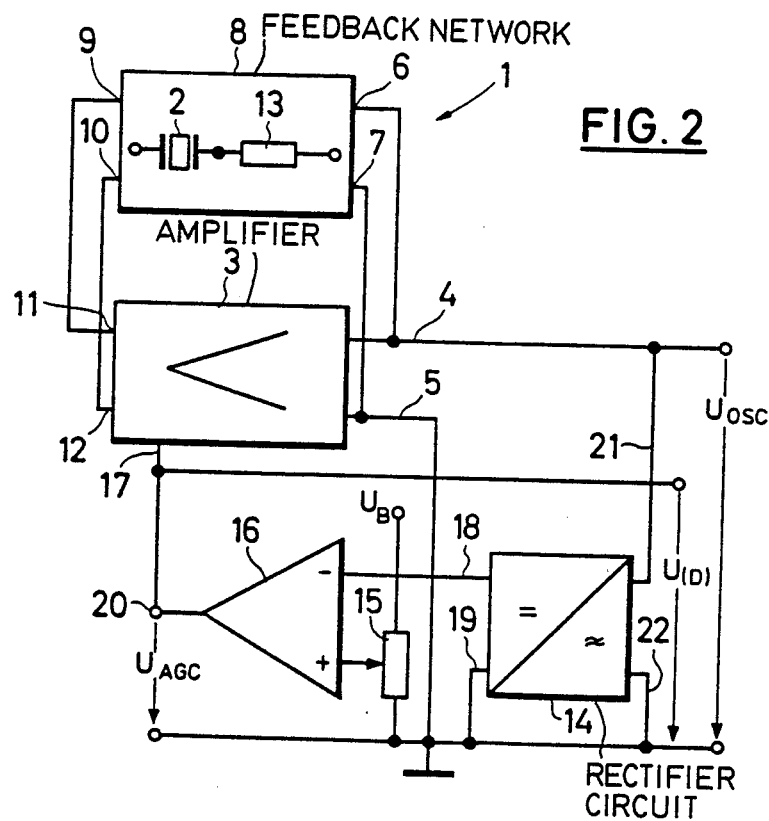

The invention relates to a system for determining the current thickness of changing coatings of a material on a substrate, using an electrically excitable, mechanically vibratable element (2) having at least one pronounced resonant frequency, which is excited to a steady vibration by an oscillator circuit (1) at a resonant frequency, and which is covered by the material in the same manner as the substrate. A signal ($U_D$) is produced which depends on the damping caused by the coating of the vibratable element (2). This signal ($U_D$) is compared with a known critical value signal ($U_{DE}$) whereby it is possible to indicate when the vibratable element (2), which can be coated with the material only to a certain degree, must be replaced with a new vibratable element (FIG. 2).

13 Claims, 4 Drawing Sheets

SYSTEM FOR DETERMINING THE THICKNESS OF VARYING MATERIAL COATINGS

The invention relates to a system for determining the current thickness of varying coatings of materials on a substrate during the coating process, especially for the production of thin coatings in the optical industry and in the semiconductor industry, using an electrically excitable, mechanically vibratable element having at least one pronounced resonant frequency, which is excited to steady vibration by an oscillator circuit at a resonant frequency and which is coated with the material in the same manner as the substrate.

Systems for the in situ measurement of coating thicknesses and coating rates are very important to the production of thin coatings in the optical industry and in the semiconductor industry, since they permit the control of the coating thickness and coating rates during the coating process and thus permit the interruption of the coating process when a particular required level of the coating thickness is reached.

Such systems often use as the sensor element a quartz crystal pickup. The vibrating crystal is coated simultaneously with the substrates and changes its resonant frequency on account of the mass loading with this foreign layer. This resonance frequency is used as a highly sensitive measure of the applied coating thickness or for the coating rate, i.e., for the change in thickness per unit time. Since the resonant frequency changes in very close proportion to the surface density of the foreign coating mass, the above-mentioned systems are also called quartz crystal microscales.

These systems for measuring coating thickness and coating rates can be used basically for all vacuum coating processes; their greatest technical importance, however, is to be found in the vapor depositing process. These systems are therefore also referred to as vapor depositing monitors.

Quartz crystal oscillator circuits are used for the excitation of the thickness coating measurement crystal to vibration and to the output of an alternating current whose frequency is equal to the excited mechanical resonant frequency of the crystal.

The time for which a sensing crystal can be used is limited, since the foreign coating growing thereon leads sooner or later to the suppression of the vibration. The sensing crystal must then be replaced with a new, uncoated crystal. Since failure of the crystal during a vapor depositing process makes it impossible to continue the controlled deposition until the required coating density is reached and thus all of the substrates (the whole charge) remaining in the vacuum chamber become unusable, it is extremely desirable to replace the sensing crystal in due time before beginning the vapor depositing process during which the end of its useful life must be expected. A signal that in any form indicates how much of the entire useful life of the crystal has been used up or how much of it is still available is therefore of great economical importance. To some extent it will indicate the operating safety reserve for the type and amount of material applied to the sensor crystal.

A process is known for determining the thickness of thin coatings on a substrate by means of a quartz crystal which is coated at the same time that the substrate is coated (DE-OS No. 31 45 309). In this known process the frequency time or the period time, which varies with the growing coating, is used in determining the coating thickness or the density by surface of the mass of the coating. A disadvantage of this known process is that it is poorly suited for the derivation of a signal indicating the operating safety reserve or the consumption state change of the sensing crystal.

Also known is a vibrating crystal measuring system with which a determination of the mass thickness from fractions of a microgram up to a mass charge of several milligrams can be performed (H. K. Pulker: Untersuchung der kontinuierlichen Dickenmessung dünner Aufdampfschichten mit einer Schwingquarzmesseinrichtung, Zeitschrift für angewandte Physik, vol. 20, No. 6, 1966, pp 537 to 540). In this measuring system a reference oscillator is provided in addition to a quartz crystal oscillator. The signals put out by the two oscillators are fed to a first mixer stage whose output signal, together with a frequency of about 250 KHz, is in turn fed to a second mixer stage. The output signal of this second mixer stage is fed through a pulse converter to a digital frequency readout. However, the consumption state change of the sensor crystal cannot be indicated with this known system.

Also known is a measuring system whereby the thickness of growing coatings can be measured during the growing process (W. H. Lawson: A versatile thin film thickness monitor of high accuracy, J. Sci. Instrum., 1967, vol. 44, No. 11, pp 917 to 921). Neither is it possible with this apparatus to indicate the consumption state change of the sensor crystal.

In the cases known heretofore, such an indication is derived from the total frequency change caused by the coating thickness accumulated on the crystal. This was either directly indicated or a percentage figure was displayed which gives the actual frequency change $\Delta f$ with reference to a maximum frequency change $\Delta f_{max}$ that is assumed in a largely arbitrary manner. Incorrectly, these readings have also been called "lifetime indexes." Other vapor depositing monitors display the total coating thickness accumulated on the crystal, in microns for example, according to the fequency change.

All of the former kinds of indication of the operating safety reserve or consumption state change of coating thickness measuring crystals can be characterized as frequency-related indications. This applies without restriction also to all apparatus which operate on the so-called period time method of measurement. In these the period time change of the resonant vibration is used both as an index of coating thickness and as an index of the operating safety reserve, but on account of the direct relationship between the resonant frequency f and the period time 1/f, it is frequency-related indications exclusively that are again involved in principle.

The great disadvantage of these frequency-dependent indications of the operating safety reserves is that they are unable to make allowance for the extremely pronounced relationship between the material and the achievable maximum useful life of the sensor crystal. With many metal vapor-deposited coatings such as aluminum, silver and copper, when conventional coating thickness measuring crystals with a starting frequency of, for example, 6 MHz, are used, frequency ranges up to the failure of the crystal of about 1 MHz are obtained, i.e., the frequency at crystal failure is 5 MHz, while for example with a tungsten coating or a dielectric coating of $MgF_2$ swept frequency ranges up to about only 10 kHz are obtained, i.e., the frequency at crystal failure amounts to 5.99 MHz. Furthermore, even with the same vapor-depositing material, different measuring crystals often have very different frequency ranges up to the cessation of the resonant vibration. It is therefore obvious that the frequency-related index of the operating safety reserve or of the consumption state change is unable to provide any useful information for the timely replacement of the crystal, unless additional comprehensive experience or statistics on the performance of different vapor-deposited materials are taken into consideration and the scatter of the crystal is greatly narrowed. In this manner, however, the former methods and systems fail to achieve the purpose, namely to provide a direct, reliable index for the timely, but not unnecessarily early, replacement of the crystal.

The invention therefore is addressed to the task of creating a system whereby it will be possible to monitor a mechanically vibrating element without using frequency-related means.

This task is accomplished by the distinctive features of claim 1.

The fundamental idea of the invention thus consists in replacing the known frequency-related index of the operating safety reserve by a damping-related index of the operating safety reserve. Thus use is made of the circumstance that the cause of the failure of a crystal is not the exceeding of a given critical frequency, but the exceeding of a certain limit of the crystal damping caused by the coating.

The index of the operating safety reserve or consumption state change can be derived in various ways from the damping-related signal $U_D$. For example, the voltage $U_D$ can be indicated directly in volts, but it is important that the critical value of $U_D$ at which the vibration stops is simultaneously known. In the case of an analog display, this limit value can be entered as a mark on the scale, for example.

Especially in the case of a digital display, a percentage statement of the operating safety reserve $B_R$ according to the equation $$B_R(\%) = 100\% \cdot (U_{DE} - U_D)/(U_{DE} - U_{DS})$$

is advantageous, wherein $U_{DE}$ represents the limit of the damping-related signal voltage at which the vibration is just barely sustained, $U_D$ the damping-related voltage still occurring, and $U_{DS}$ the damping-related voltage at the beginning of the first coating of the vibrating element. It is also, of course, conceivable to state the amount of operating safety margin already consumed ($100\% - B_R$) instead of the operating safety reserve.

A very suitable measure for stating the operating safety reserve is also the index of the remaining useful time $t_R$ of the vibrating element that is still available, according to the equation $$t_R = (t_2 - t_1)(U_{DE} - U_{D2})/(U_{D2} - U_{D1}),$$

wherein $t_2$ and $t_1$ are the times at the beginning and end, respectively, of the preceding coating process, $U_{D2}$ and $U_{D1}$ are the values of the signal $U_D$ at the end and beginning, respectively, of the preceding coating process. Here use is made of the circumstance that, toward the end of the useful life of the vibrating element, there is an approximately linear relationship between the resonator damping and the coating time.

An additional, very suitable means for stating the operating safety reserve is also the indication of the remaining coating thickness $l_R$ that can still be applied to the crystal before the cessation of vibration, according to the equation $$l_R = (l_2 - l_1)(U_{DE} - U_{D2})/(U_{D2} - U_{D1}),$$

wherein $l_2$ and $l_1$ are the thicknesses determined from the resonant frequency values of the vibrating element at the beginning and end, respectively, of the preceding coating process, $U_{D2}$ and $U_{D1}$ are the values of the signals $U_D$ at the end and beginning, respectively, of the preceding coating process. Here use is made of the circumstance that, toward the end of the life of the vibrating element, an approximately linear relationship exists between the resonator damping and the applied coating thickness.

Although the invention is carried out, as a rule, with a quartz crystal, it is not limited thereto. Instead of a quartz crystal any other electrically excitable vibratory elements can be used having at least one pronounced resonant frequency, such as piezoelectric resonators of lithium niobate or the like, for example.

Embodiments of the invention are represented in the drawing and are further described below.

Figure 1:
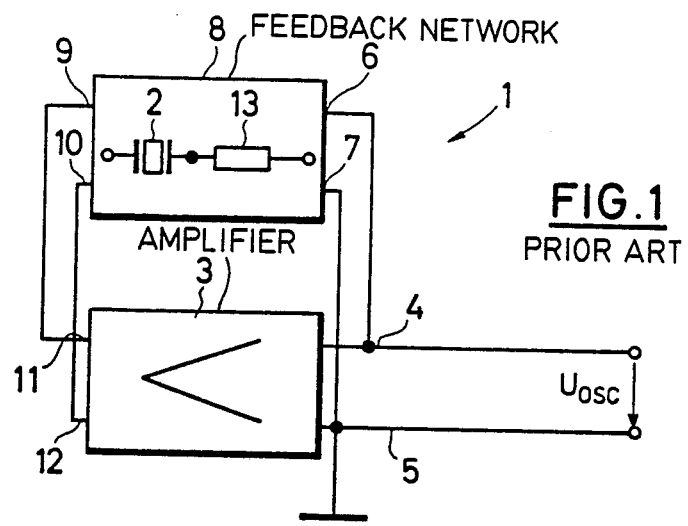
Figure 3:
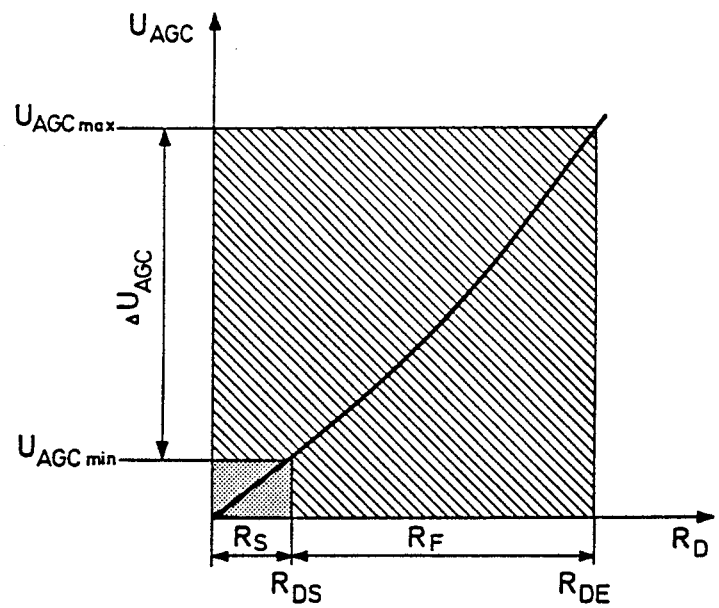
Figure 6:
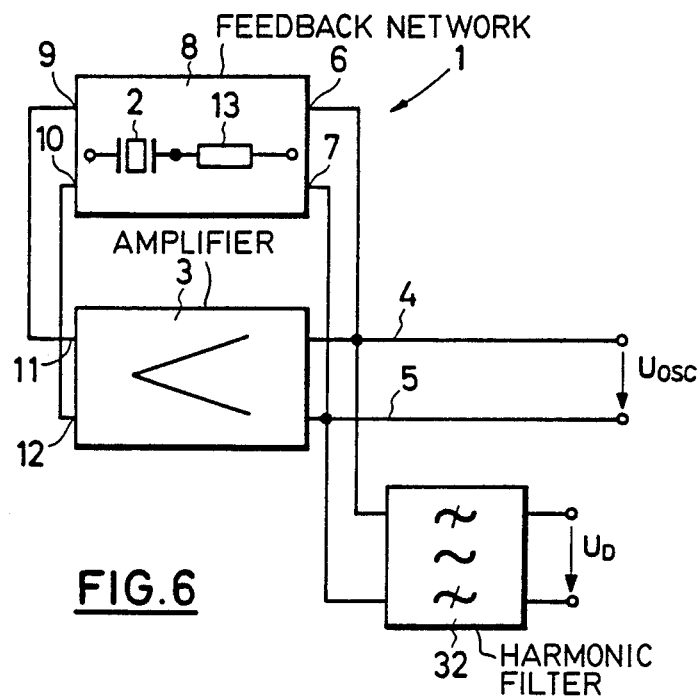
Figure 4:
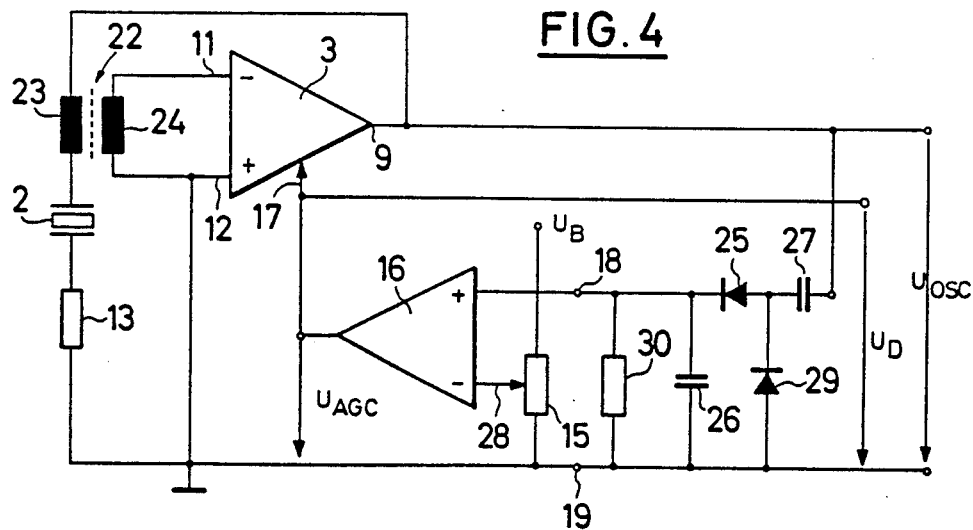
Figure 5:
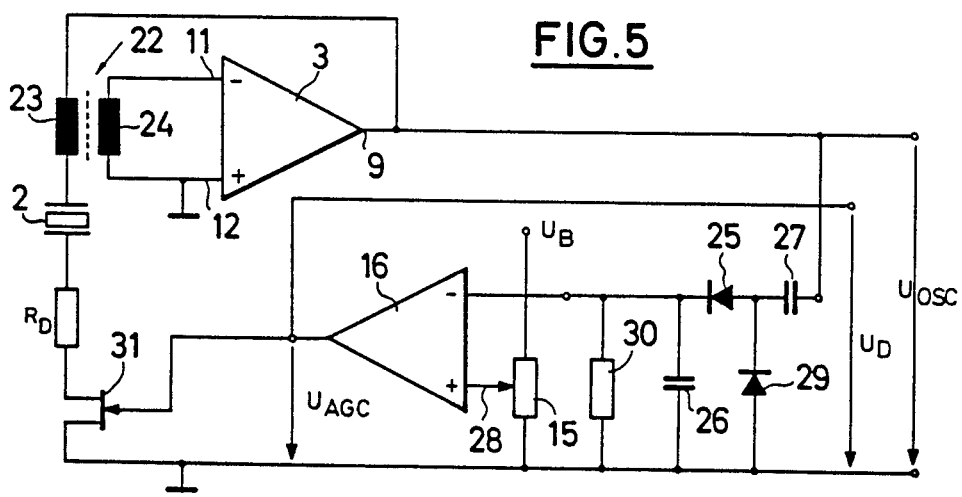
Figure 7:
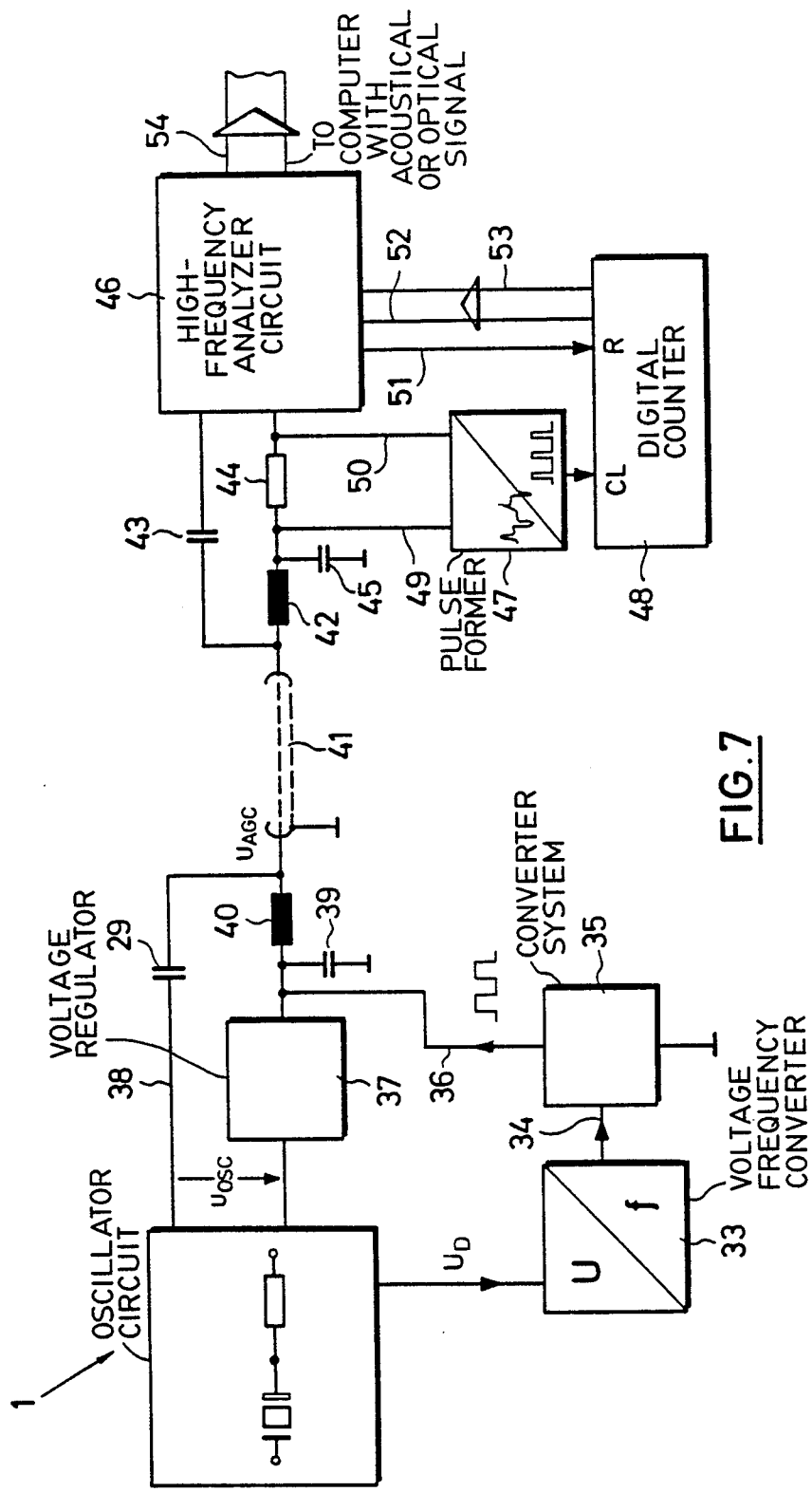

FIG. 1 shows a block circuit diagram of a conventional quartz oscillator,

FIG. 2 is a block circuit diagram of an oscillator for the embodiment of the invention, FIG. 3 shows the functional relationship between the amplification control voltage $U_{AGC}$ and the series resonant resistance $R_D$ of the quartz crystal, FIG. 4 shows a detailed embodiment of the block circuit diagram of FIG. 2, FIG. 5 shows an additional embodiment which assumes an amplitude-controlled oscillator, FIG. 6 shows an embodiment which does not assume an amplitude-controlled oscillator, FIG. 7 shows a circuit in which a coaxial cable is provided between an oscillator circuit and an analyzer circuit and serves for simultaneous DC, low-frequency and high-frequency transmission.

The block circuit diagram of a conventional oscillator circuit 1 for the excitation of a quartz crystal 2 is shown in FIG. 1. It consists of an amplifier 3 whose output lines are connected to the inputs 6, 7, of a feedback network 8. The output lines 9 and 10 of this feedback network 8 are connected to the inputs 11 and 12 of the amplifier 3.

The quartz crystal behaves, of course, like a resonant circuit, having a series and a parallel resonant frequency (Beuth/Schmusch: Grundschaltungen der Elektronik, vol. 3, 1981, pp 270-272; Zinke/Brunswig: Lehrbuch der Hochfrequenztechnik, 1965, pp 41-45). In series resonance the quartz crystal acts like an ohmic resistance of a few ohms. In parallel resonance it is a very high resistance. Hereinafter only series resonance will be considered, although all considerations can be applied accordingly to the case of parallel resonance.

The feedback network 8 contains as the frequency-determining element the quartz crystal 2 whose loss resistance is indicated at 13.

If the quartz crystal 2 is loaded with a layer of foreign material, it will assume the value of the resistance 13. In a circuit diagram this might be represented by connecting an additional resistance in series with the resistance 13. The foreign coating load causes a lowering of the series resonant frequency. In addition to the change in resonant frequency, the foreign coating also produces on the crystal an increase in the resonator damping, which is defined as the ratio of the power loss to the reactive power.

The circumstance that the entire loss resistance of the quartz crystal is the result of the series connection of the loss resistance 13 of the unloaded crystal 2 and of the loss resistance caused by the foreign coating can be expressed by the following equation:

$$R_D = R_S + R_F$$

wherein $R_D$ is the total loss resistance, $R_S$ the loss resistance of the unloaded crystal, and $R_F$ the loss resistance caused by the foreign coating.

The resistance value $R_D$ assumes the impedance of the loaded crystal 2 when it is operated precisely at its series resonance. In this case the amount of the loop amplification $U_{11,12}$ between the inputs 11, 12, of the amplifier 3 and the outputs 9, 10, of the feedback network 8 reaches its maximum value—imagining the connection between these inputs and these outputs to be broken. As long as the amount of the loop amplification is equal to or greater than one, and no phase rotation occurs between the inputs 11 and 12 and the outputs 11 and 12, then the vibration, with the input and output reconnected, is sustained and an alternating current $U_{OSC}$ with the frequency of the mechanical resonant vibration of the crystal is available at the output lines 4 and 5 of the oscillator circuit 1.

One peculiarity of oscillator circuits for coating thickness measuring crystals is that they must be designed for an extraordinarily great damping range. Thus, the series resonance resistance $R_D$ varies from typically $R_{Dmin} = R_S = 20$ ohms for the unloaded crystal to $R_{Dmax} = 1.5$ ohms for the heavily loaded crystal at the end of its time of use. This problem is usually solved by "superregeneration," i.e., the amount of loop amplification is made much greater than one for the unloaded crystal and does not reach the limit value of one until the end of the time of use. On account of the pronounced overmodulation, such oscillators give a heavily distorted output signal which does not become sinusoidal until towards the end of the range of use. Another possibility is the use of an amplitude-controlled oscillator with a correspondingly great control range. Such an oscillator delivers a sinusoidal alternating current with an amplitude that is approximately constant over the entire range of use.

In FIG. 2 is shown a circuit with which a damping-related voltage is obtained in an amplitude-controlled oscillator. The principle of the amplitude-controlled oscillator is known from the art of precision crystal oscillators as frequency standards. The alternating current put out at the terminals 4 and 5 of the amplifier 3 is rectified, and the DC voltage obtained is compared with a reference voltage which is derived usually through an adjustable voltage divider 15 from a working voltage $U_B$. The difference is amplified by a differential amplifier 16 and serves as the control direct current $U_{AGC}$ for the amplifier 3 which has an amplification dependent upon the voltage applied to its control input 17 for the alternating current present at the amplifier inputs 11 and 12.

When such an oscillator is used for the excitation of thickness measuring crystals, the damping resistance $R_D$ increases as the crystal is increasingly loaded with the foreign coating. A lowering of the output voltage $U_{OSC}$, however, causes a reduction of the direct current at the outputs 18 and 19 of the rectifier circuit 14, and this in turn produces an increase in the voltage $U_{AGC}$ at the output 20 of the differential amplifier 16, which finally results in an increase of the amplification factor which largely offsets any lowering of the output voltage $U_{OSC}$. This can also be considered as a constant loop amplification, since the greater attenuation in the feedback network is compensated by an increase of the amplification factor.

FIG. 3 shows the typical curve of the control voltage $U_{AGC}$ as a function of the series resonance resistance $R_D$. Different coordinate points are highlighted, which are defined by $U_{AGCmax}$, $U_{AGCmin}$, $R_{DS}$ and $R_{DE}$. $R_{DS}$ in this case indicates the resistance at the beginning of the additional damping, while $R_{DE}$ represents the resistance at the end of the additional damping. Since there is a direct functional relationship between the series resonance resistance $R_D$ and the amplification of amplifier 3 needed to sustain the vibration, and since the amplification is again a function of the control voltage $U_{AGC}$, the control voltage can be regarded as a damping-related voltage $U_D$. In the ideal case the voltage $U_D$ varies in proportion to the damping; in general, however, the relationship is not linear. The departure from linearity is determined primarily by the functional relationship between the amplification control voltage $U_{AGC}$ and the loop amplification. For the derivation of a suitable damping-related display of the time of use, a voltage will suffice which varies uniformly with the damping, that is, the curve must have no extremes and turning points, and the voltage must rise or fall steadily as the damping increases.

FIG. 4 shows a detailed oscillator circuit diagram for obtaining the damping-related voltage $U_D$. Differential amplifiers are used as the amplifiers 3 and 16. In the case of amplifier 16, the inverting input (−) and noninverting input (+) are the opposite of FIG. 2, since the example of embodiment (Motorola's MC 1590) has a negative amplification control characteristic for the amplifier 3; that is, as the control voltage $U_{AGC}$ increases the amplification decreases. The feedback network consists of a coupling transformer 22 whose primary side 23 is in series with the sensing crystal 2 at the output 9 of the amplifier 3 and its secondary side 24 is connected to the input 11 and 12 of this amplifier 3. A half-wave circuit is used as the rectifier circuit. The diode 25 charges a condenser 26 during each positive half-wave. The coupling condenser 27 serves only for cutting off the DC potentials at the output 9 of the amplifier 3 and at the inverting input 28 of the amplifier 16. A diode 29 permits the alternating current to flow through the coupling condenser 27, since it passes each negative half-wave. The resistance 30 is such that, on the one hand it is substantially greater than the output resistance of the amplifier 3, and on the other hand it produces with the condenser 26 a sufficiently small time constant to enable the control to react sufficiently rapidly in the event of an abrupt increase in damping. The rectifier circuit given operates virtually as a peak rectifier, i.e., the DC produced is virtually equal to the amplitude of the alternating current $U_{OSC}$ except for the voltage drop caused by the diode forward voltage.

FIG. 5 shows a variant of the circuit of FIG. 4, which is advantageous whenever it is desired to use a normal differential amplifier with only a permanently set amplification as the amplifier 3.

The necessary equalization of the rise of the damping resistance $R_D$ is here achieved by the series connection of a variable compensation resistance which can be achieved by the source-drain part of a field effect transistor 31. The resistance of the source-drain part of this field effect transistor 31 can be varied within wide limits by applying a control voltage $U_{AGC}$ to the gate terminal. The increase of the damping resistance $R_D$ produced by the foreign layer on the sensing crystal 2 is largely compensated by a reduction, produced by the gate voltage rise, of the compensation resistance over the entire range of use, and the loop amplification is kept constant.

The drain-source part of the field effect transistor 31 does not need to be connected directly in series with the crystal: the same purpose is achieved if it is used in series with the secondary winding 24 of the transformer 22 or at any other point of a more complex feedback network. It is essential only that the loop amplification depend directly on the resistance of the drain-source part.

In FIG. 6 is shown how, in a non-amplitude-controlled oscillator circuit 1, i.e., in one operating with "superregeneration," a damping-related signal can be obtained. For this purpose a harmonic filter 32 is connected to the outputs 4 and 5 of such an oscillator. It must be designed as a relatively broad bandpass filter, since the harmonic frequency changes as the coating load increases. With increasing coating load the damping resistance $R_D$ increases, causing the attenuation factor of the feedback network 8 to increase, the loop amplification to decrease accordingly, and the amount of superregeneration to decrease. Lower overmodulation, however, means less distortion of the output voltage $U_{OSC}$. This results in a reduction of the amplitudes in the harmonic spectrum. The amplitude of the output signal of the harmonic filter 32 can therefore be used as a damping-related voltage $U_D$ since it decreases monotonically with increasing crystal damping. Of course, a damping-related direct current can be produced by connecting a rectifier circuit not shown in FIG. 6 to the output. On account of the initially more or less square-wave output voltage $U_{OSC}$ of this type of oscillator, it is advantageous to filter out the 3rd harmonic from this harmonic spectrum, since according to Fourier analysis this one has the greatest amplitude. In the thickness measuring crystals typically used, with an initial basic frequency of 6 MHz, the harmonic filter 32 must be designed for a frequency range of about 15 to 18 MHz. Especially suited are band filters such as those known in radio technology, for example as intermediate frequency filters which are composed of two inductively coupled parallel resonant circuits and have a center frequency of 16.5 MHz.

In FIG. 7 is shown a circuit having an oscillator circuit 1 and an analyzer circuit connected together by a coaxial cable 41.

The coaxial cable 41 serves in this case not only for carrying the DC supply voltage and the high-frequency signals but also for carrying low-frequency signals.

The damping-related DC voltage $U_D$ produced by the oscillator circuit 1 is in this case fed to a voltage-frequency converter 33 and converted by the latter to a low-frequency voltage. This low-frequency voltage is fed to an additional converter system 35 which converts the low-frequency voltage to a low-frequency square-wave current. This low-frequency current is fed through a low-pass filter, consisting of a choke 40 and a condenser 39, to the coaxial cable 41. After the low-pass filter 39/40 the high-frequency oscillator voltage $U_{OSC}$ is fed through a condenser 29 likewise into the coaxial cable 41. Between the low-pass filter 39/40 and the oscillator circuit 1 there is a voltage regulator 37.

On the input side of the analyzer circuit there is also provided a low-pass filter which consists of the choke 42 and the condenser 45. Between this low-pass filter 42/45 and an input of a high-frequency analyzer circuit 46 is a resistance 44 whose voltage drop is fed to a pulse former 47. The junction between the coaxial cable 41 and the choke 42 is connected by a condenser 43 to another input of the high-frequency analyzer circuit 46.

The pulse former 47 converts the entering pulses to square-wave pulses which can be processed by a digital counter 48, for example a 2×BCD counter. This digital counter 48 is in turn connected by data lines 51, 52 and 53 to the HF analyzer circuit 46. On the basis of the signals received, the HF analyzer 46 produces data which are delivered for final analysis and display via a data bus 54 to a personal computer, for example. An acoustic or optical signal may be used to indicate that replacement of the vibratable element is needed.

The second circuit system which relates the electrical signal $U_D$ to a given limit value signal $U_{DE}$ of this signal $U_D$, can be made in many different, known ways, and therefore it is not represented and described in detail in the present case. The same applies to the actual display circuit and system.

We claim:

1. A system for determining the current thickness of changing coatings of material on a substrate during the coating process, especially for the production of thin coatings in optical devices and semiconductors, comprising:
   an electrically excitable, mechanically vibratable element with at least one pronounced resonant frequency;
   an oscillator circuit for exciting said vibratable element at a resonant frequency to a stationary vibration;
   said vibratable element being coated with the material in the same manner as the substrate;
   first circuit means for producing a varying electrical signal ($U_D$) which changes monotonically with the damping of the mechanical resonance that is caused by the coating of said vibratable element;
   second circuit means for relating the electrical signal ($U_D$) to a fixedly given electrical limit value signal ($U_{DE}$) occurring at a limit damping at which the vibratable element can still just be excited to a stationary vibration;
   means for indicating the relationship between the varying signal ($U_D$) and the fixedly given electrical signal ($U_{DE}$) as a consumption state change of said vibratable element.

2. A system according to claim 1, which includes means for forming a ratio of differences of signal values, the difference between the limit value of said limit value signal ($U_{DE}$) and a current value of said varying signal ($U_D$) being in the numerator while the difference composed of said limit value of said limit value signal ($U_{DE}$) and the value of said varying signal ($U_{DS}$) before the start of the first application of material is in the denominator, and means for displaying said ratio multiplied by 100 as a percentage measure of the consumption state change of said vibratable element.

3. A system according to claim 1, which includes means for forming a ratio of differences of signal values, the difference composed of the limit value of said limit value signal ($U_{DE}$) and a value of said varying signal ($U_{D2}$) at the end of a preceding coating process being in the numerator while the difference composed of the values at the end ($U_{D2}$) and beginning ($U_{D1}$) of this preceding coating process is in the denominator, and means for multiplying this ratio by the duration of this coating process, and means for displaying the result as the remaining time of use of said vibratable element that is to be expected before cessation of the vibration.

4. System according to claim 1, which includes means for forming a ratio of differences of signal values, the difference composed of a critical value of said varying signal ($U_{DE}$) and a value of said varying signal ($U_{D2}$) at the end of a preceding coating process being in the numerator, while the difference composed of the values at the end ($U_{D2}$) and beginning ($U_{D1}$) of this preceding coating process is in the denominator, and means for multiplying this ratio by the coating thickness applied during the coating process, and means for displaying the result as the coating thickness that is probably still applicable before cessation of the vibration.

5. A system according to claim 1, in which said vibratable element is a piezoelectric resonator.

6. A system according to claim 5, in which said vibratable element is a quartz crystal.

7. A system according to claim 6, in which said oscillator circuit includes a control circuit which keeps constant the amplitude of alternating current ($U_{OSC}$) produced by said oscillator circuit within a fixed range of the quartz crystal damping, a control voltage ($U_{AGC}$) for loop amplification ($G_S$) being used as a damping-related signal ($U_D$).

8. A system according to claim 7, in which said control circuit includes an amplifier which is used as an integrated differential amplifier and in which said oscillator circuit has an amplification factor ($G_A$) that is variable through the control voltage ($U_{AGC}$).

9. A system according to claim 7, which includes for the achievement of a loop amplification of ($G_S$) that is variable by the control voltage ($U_{AGC}$), a field-effect transistor effecting a voltage-controlled resistance.

10. A system according to claim 1, which includes a filter for filtering out a harmonic signal from an alternating output voltage ($U_{OSC}$) of said oscillator circuit and which utilizes the amplitude of the filtered signal as a damping-related voltage ($U_D$).

11. A system according to claim 1, in which dropping below a certain preselectable limit value of the consumption state change produces at least one of an acoustical and optical signal calling for the timely replacement of the vibratable element.

12. A system according to claim 1, which includes a coaxial cable which is provided both for direct-current supply and for high-frequency and low-frequency transmission.

13. A system according to claim 12, which includes a voltage/frequency converter for producing a low-frequency alternating current signal from a damping-related varying voltage signal ($U_D$), whose frequency varies monotonically with the damping-related voltage signal ($U_D$) and which is fed current-impressed into the same coaxial cable through which the (DC) power supply of the oscillator and the voltage-impressed transfer of the oscillator alternating current ($U_{OSC}$) are fed.

* * * * *